No. 695,353. Patented Mar. 11, 1902.
J. R. TURNER.
TOOL FOR ROSSING AND PEELING PULP TIMBER.
(Application filed Aug. 9, 1901.)
(No Model.)
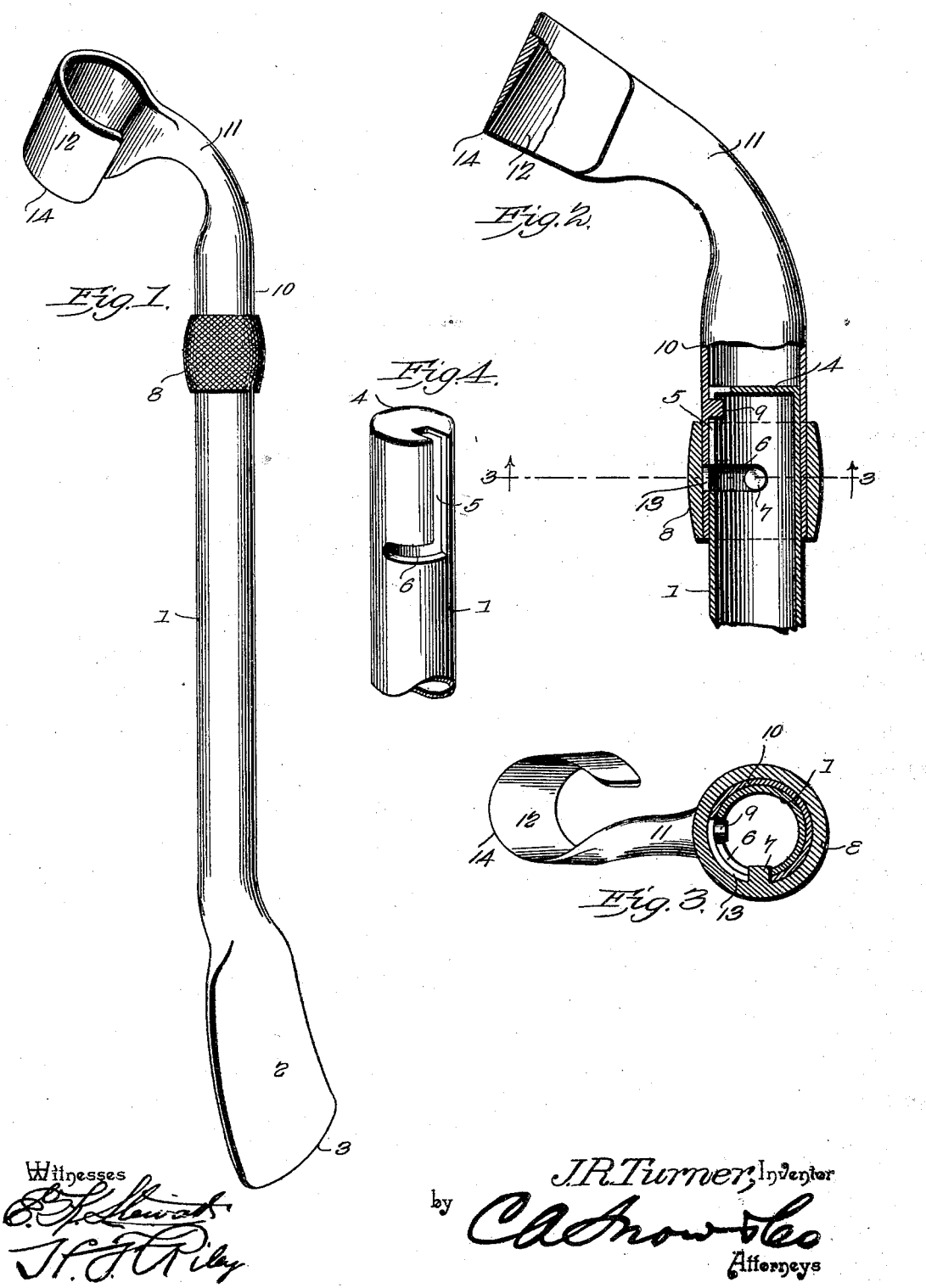
Witnesses
J. R. Turner, Inventor
by C. A. Snow & Co.
Attorneys

UNITED STATES PATENT OFFICE.

JAMES RICHARD TURNER, OF WENTWORTH LOCATION, NEW HAMPSHIRE.

TOOL FOR ROSSING AND PEELING PULP-TIMBER.

SPECIFICATION forming part of Letters Patent No. 695,353, dated March 11, 1902.

Application filed August 9, 1901. Serial No. 71,525. (No model.)

*To all whom it may concern:*

Be it known that I, JAMES RICHARD TURNER, a citizen of the United States, residing at Wentworth Location, in the county of Coos and State of New Hampshire, have invented a new and useful Tool for Rossing and Peeling Pulp-Timber, of which the following is a specification.

The invention relates to a tool for rossing and peeling pulp-timber.

The object of the present invention is to provide a simple, inexpensive, and efficient tool adapted to be readily and conveniently handled and capable of enabling the bark to be peeled and rossed from trees for preparing the latter for the manufacture of pulp.

The invention consists in the construction and novel combination and arrangement of parts hereinafter fully described, illustrated in the accompanying drawings, and pointed out in the claims hereto appended.

In the drawings, Figure 1 is a perspective view of a tool constructed in accordance with this invention. Fig. 2 is a sectional view of one end of the tool, illustrating the construction of the rossing-iron. Fig. 3 is a transverse sectional view on the line 3 3 of Fig. 2. Fig. 4 is a detail perspective view of the inner end of the rod or bar which is provided with the blade for peeling the bark from trees.

Like numerals of reference designate corresponding parts in all the figures of the drawings.

1 designates a rod or bar, which is preferably tubular and which is provided at its outer end with a broad thin blade 2, having a slight curve and provided at its outer end with a cutting edge 3. The blade, which is curved longitudinally, is adapted for peeling the bark from trees, and it will enable the bark to be quickly and effectively removed therefrom. The blade is provided with a solid shank, which is suitably secured to the tubular portion of the rod or bar. The other or inner end 4 of the rod or bar is preferably closed, as clearly shown in Fig. 4, and it is provided with an L-shaped slot or groove, consisting of a longitudinal branch or portion 5 and a transverse branch or portion 6, which extends laterally from the inner end of the longitudinal branch or portion to permit a movable lug 7 of a sleeve 8 to be carried out of alinement with a fixed lug 9 of a tubular shank 10 of a rossing-iron 11. The rossing-iron, which is provided with a blade 12, has its outer portion bent at an angle to offset the blade from the plane of the rod or bar 1. The tubular shank 10 fits on the inner end of the rod or bar 1, and the lug 9, which extends inward from the shank 10, engages the slot or groove near the outer end thereof, as clearly shown in Fig. 2. The lug 7, which extends inward from the sleeve 8, operates in a transverse slot 13 of the shank 10, and when the latter is placed on the rod or bar the two lugs or projections are in alinement. When the lug or projection 7 reaches the inner end of the longitudinal branch or portion 5 of the groove or slot, the sleeve is partially rotated to carry it into the transverse branch or portion 6 of the said slot, whereby the rossing-iron is securely fastened to the inner end of the rod or bar 1. By rotating the sleeve backward the lug or projection 7 may be brought into alinement with the longitudinal slot or groove 5, which will permit the rossing-iron to be readily detached. The lugs or projections 7 and 9 are preferably formed by pins, which are suitably secured to the tubular shank and the sleeve; but any other construction may be employed. The sleeve 8 is placed on the tubular shank 10 before the lug 7 is applied to it, and the lug 7, which preferably consists of a pin, as before explained, is then fixed to the sleeve in any suitable manner. The lug 7 retains the sleeve on the shank 10 when the latter is detached from the bar or rod, and it thereby prevents the sleeve from becoming lost. The shank of the rossing-iron is approximately L-shaped, the outer portion of the shank being arranged substantially at an angle of forty-five degrees to the inner portion of the shank; but the angle may be changed or varied, as desired. The blade 12, which is curved, is approximately cylindrical, its outer end terminating short of the shank to provide a rear opening or space, as shown in Fig. 3. The blade tapers from its outer to its inner edge 14, which is a cutting edge, and it is adapted to be drawn over a tree or limb to remove the bark or scale. The rossing-iron will be found effective in working at the tops of trees, and it will enable the bark and scale to be quickly removed therefrom. The broad thin blade 2 is adapted for removing the bark from other parts of trees, and the rossing-iron may be quickly detached to enable the blade 2 and the bar or rod 1 to be used alone.

It will be seen that the tool is exceedingly simple and inexpensive in construction, that it possesses great strength and durability, and that it forms an effective instrument for rossing and peeling the bark and scale from trees in preparing the timber for the manufacture of pulp.

What I claim is—

1. A tool of the class described provided at one end with an arm extending outward at an angle and having a transversely-curved blade connected at one end with the arm and having its other end terminating short of the same, said blade being provided with an inner cutting edge and adapted for rossing trees, substantially as described.

2. A tool of the class described provided with a rossing-iron having an angularly-disposed arm terminating in a transversely-curved approximately cylindrical blade formed integral with the arm and having its outer end arranged adjacent to and spaced from the same, said blade being provided with an inner cutting edge, substantially as described.

3. A tool of the class described comprising a rod or bar, an arm arranged at an angle to the other end of the rod or bar, and a transversely-curved approximately cylindrical blade located at the outer end of the arm and set at an angle and provided with an inner cutting edge, substantially as described.

4. A tool of the class described comprising a bar having an L-shaped slot, a rossing-iron provided with a blade and having a tubular shank, said tubular shank being provided with a fixed interiorly-arranged stud or projection to engage the said slot, and a sleeve secured to the shank and capable of a limited rotary movement and provided with a stud or projection adapted to be turned into the transverse portion of the said slot, substantially as described.

5. A tool of the class described comprising a bar provided with an L-shaped slot, a tubular shank adapted to fit on the slotted end of the bar and provided with a transverse slot, a fixed projection arranged within the tubular shank for engaging the L-shaped slot, a sleeve having a projection extending through the transverse slot of the shank and adapted to engage the L-shaped slot, and a blade arranged at the outer end of the shank, substantially as described.

In testimony that I claim the foregoing as my own I have hereto affixed my signature in the presence of two witnesses.

JAMES RICHARD TURNER.

Witnesses:
JAMES I. PARSONS,
MELBOURN P. DE LONG.